United States Patent [19]
Schwarz

[11] 3,979,775
[45] Sept. 7, 1976

[54] MAGNETORESISTIVE MULTITRANSDUCER ASSEMBLY WITH COMPENSATION ELEMENTS FOR THERMAL DRIFT AND BIAS BALANCING

[75] Inventor: Theodore Albert Schwarz, Saratoga, Calif.

[73] Assignee: International Business Machines Corporation, Armonk, N.Y.

[22] Filed: Sept. 8, 1975

[21] Appl. No.: 611,466

[52] U.S. Cl. ............................... 360/113; 324/46; 360/123
[51] Int. Cl.² .................. G11B 5/30; G11B 5/20
[58] Field of Search .......... 360/113, 124, 122, 123, 360/31, 25; 324/46; 338/32 R

[56] References Cited
UNITED STATES PATENTS

| | | | |
|---|---|---|---|
| 3,860,965 | 1/1975 | Voegeli | 360/113 |
| 3,881,190 | 4/1975 | Brock | 360/113 |
| 3,918,091 | 11/1975 | Walraven | 360/113 |

OTHER PUBLICATIONS

IBM Technical Disc. Bull., *Balanced Resistance MR Head Compensated* R. Anderson et al, vol. 17, No. 11 Apr. 1975, p. 3478.

IBM Technical Disc. Bull., *Magnetoresistive Current Sensor*, A. J. Bowen, vol. 17, No. 3, Aug. 1974 p. 728.

IBM Tech. Disc. Bull., *Resistive Element for Bias and Noise Cancellation of Magnetoresistive Head*, vol. 17, No. 9 Feb. 1975 p. 2759.

IBM Tech. Discl. Bull. *Balanced Magnetic Head*, O'Day, vol. 15, No. 9 Feb. 1973 p. 2680.

*Primary Examiner*—Bernard Konick
*Assistant Examiner*—Jay P. Lucas
*Attorney, Agent, or Firm*—James A. Pershon

[57] ABSTRACT

An extra MR element is vapor deposited together with a plurality of MR read elements in a head assembly to balance the bias signal and to compensate for thermal drift. The compensation MR element is connected to one input of differential amplifiers whose second input is connected to the read elements. Separate compensation elements can be used to balance an AC bias current distribution by paired 180° out-of-phase operation to prevent overloading of the common ground return lead.

12 Claims, 9 Drawing Figures

MAGNETORESISTIVE MULTITRANSDUCER ASSEMBLY WITH COMPENSATION ELEMENTS FOR THERMAL DRIFT AND BIAS BALANCING

BACKGROUND OF THE INVENTION

This invention relates generally to a magnetic transducer structure and more specifically to a transducer including a magnetoresistive element used to produce, detect or control production or detection of magnetic flux.

FIELD OF THE INVENTION

Magnetoresistive (MR) transducing elements are well known in the art. Sensing transducers using MR elements have been developed and used to sense magnetic flux from a moving magnetic media such as tapes or disks and to sense magnetic bubble domains.

It is highly desirable to use magnetoresistive elements in head assemblies for sensing the recorded data. MR heads are thin and afford a savings in space and are adaptable to batch fabrication. Furthermore, the signal output of the MR elements is substantially larger than that experienced with an inductive read transducer. However, MR elements are susceptible to thermal fluctuations which produce a resistance change in the elements by passing bias current through them or by temperature changes in the operating environment. Several ways have been discovered to overcome this problem. The present invention discloses several embodiments for providing a compensation MR element for a plurality of MR read elements in a multiple transducer head assembly for balanced AC bias operation and thermal drift compensation.

DESCRIPTION OF THE PRIOR ART

Several disclosures of thermal drift compensation of magnetoresistive heads have been published including the publication "Resistive Element for Bias and Noise Cancellation of Magnetoresistive Head" in the IBM Technical Disclosure Bulletin at Vol. 17, No. 9, Feb. 1975 at p. 2759 and the publication "Self-Biased, Noise Free Magnetoresistive Head", published in the IBM Technical Disclosure Bulletin at Vol. 17, No. 7, Dec. 1974 at p. 1862. Both of these publications disclose the use of a non-magnetoresistive layer useful for both MR element biasing and for thermal noise and drift compensation. These publications disclose the use of an additional resistive layer interconnected to permit the use of a differential amplifier for common mode rejection of the noise spikes and resistance change caused by the thermal fluctuations. Further, U.S. Pat. No. 3,860,965, issued to Otto Voegeli on Jan. 14, 1975 and assigned to the assignee of the present invention, discloses the use of two MR elements, one for sensing the magnetic flux transitions and the second for thermal compensation. The two MR elements are again interconnected to a differential amplifier to provide the common mode rejection of the thermal noise spikes and resistance change. This patent and the two articles disclose the interconnection of one compensation element for each MR sensing element and do not disclose the use of one MR element interconnected to provide thermal compensation by common mode rejection for a plurality of MR sensing elements. These prior art devices also provided thermal noise compensation, not contemplated by the present invention, because of the proximity of the compensating element to the sensing MR element.

It is, therefore, an object of the present invention to provide a multitransducer head assembly using MR sensing elements wherein one compensation element provides common mode rejection of thermal drift.

Together with the requirement of one compensation element for each sensing element, the problem of extra leads are required for each compensation element is added. Leads are difficult to fabricate and therefore increase the cost of manufacturing the head assembly, especially in a multitransducer head.

It is, therefore, another object of the present invention to provide a compensated multitransducer head assembly that is easy to fabricate and less costly than previously available.

Alternating current bias for a magnetoresistive element is well known as illustrated by the article "Application of a Magnetoresistance Element to Magnetic Recording" appearing in the IEEE Transaction on Audio, Vol. Au-13, No. 2, March 1965, at pp. 41-43. AC bias has the further advantage of permitting out-of-phase operation on individual MR elements. AC bias formerly required filter networks prior to amplification circuits to amplify only the signal and not the higher amplitude bias frequency.

Yet another object of the present invention, therefore, is to provide a bias current balancing technique using compensation elements.

Still another object of the present invention is to provide a head assembly using magnetoresistive elements biased by alternating current that does not require a filter network.

SUMMARY OF THE INVENTION

In accordance with the present invention, a transducer head assembly incorporating a plurality of magnetoresistive (MR) sensing elements includes an extra MR element for thermal drift compensation and bias balancing. One MR compensation element is connected such that common mode rejection occurs in a differential-type amplifier. The MR elements are interconnected in a configuration to reduce thermal distortion and bias signal feed through. The large voltage drop across the MR elements resulting from the bias current is eliminated by the common mode rejection connection. Biasing for the MR sensing element can be achieved by providing identical MR stripes thereby providing a soft film bias. Current biasing can be attained by providing an additional serpentine loop to bias all of the MR elements or by placing a non-magnetic resistive conductor in contact with the MR sensing element.

The compensation element is activated by a bias current along with the MR read elements. The MR read elements are connected to one input of individual differential read amplifiers. The compensation MR element is connected to the second input of each of the differential read amplifiers to provide the compensation for all of the MR read elements.

The limitation on the number of MR sensing elements that can be compensated by one MR compensation element is the current carrying capacity of the return or grounded lead. The bias current for each MR element is carried by this return lead. With the use of at least two MR compensation elements in a multisensing element transducer, the current drive can be balanced to provide little or no current in the return lead. The MR sensing elements are paired with each element of the pair driven by an out-of-phase bias source. The MR compensation elements are likewise each driven by an associated phase bias current source. The differential read amplifiers are therefore connected to one of the paired MR sensing elements and one MR compensation element both driven by an in-phase current biasing source.

Alternating current bias can be used with the multi-transducer system according to the present invention. The MR compensation elements are biased by an in-phase current to that biasing its associated MR read elements. The differential amplifiers provide common mode rejection to eliminate the amplification of the bias voltage. Further, the paired MR read elements can be driven by biasing sources generating 180° out-of-phase signals to provide current balancing in multi-transducer head assemblies.

The MR compensation element can be vapor deposited parallel or perpendicular to the air bearing surface. The compensation element can also be oriented on either or both ends of the head assembly in an outriggered design. The advantage of the parallel outrigger MR compensation elements is that any variation in the sensing element resistances due to lapping of the transducers to size and normal wear will also affect the resistances of the compensation elements.

An object of the present invention, therefore, is to provide an enhanced transducer assembly for use with magnetoresistive elements.

Another object of the present invention is to provide a single magnetoresistive compensation element to compensate for thermal changes occurring from a plurality of magnetoresistive sensing elements.

Yet another object is to provide magnetoresistive compensation elements for a plurality of sensing elements that are interconnected to lower the bias current carried by the common return lead.

Still another object is to provide a head assembly using magnetoresistive sensing elements that includes thermal and bias compensation while decreasing the number of leads required in a multitransducer configuration.

Another object is to provide a compensation element which is matched to the resistance of the MR elements and which tracks the variation in their resistance due to wear, manufacturing, and thermal fluctuations.

These and other objects of the present invention will become apparent to those skilled in the art as the description proceeds.

BRIEF DESCRIPTION OF THE DRAWINGS

The various novel features of this invention, along with the foregoing and other objects as well as the invention itself both as to its organization and method of operation, may be more fully understood from the following description of illustrated embodiments when read in conjunction with the accompanying drawing wherein.

DESCRIPTION OF THE PREFERRED EMBODIMENTS

In the present invention, an alternating current bias source and a magnetoresistive (MR) compensation element are interconnected such that one MR compensation or balance element can be used for a plurality of MR read or sensing elements. In this invention, the advantages of an alternating current bias is combined with the use of a compensation element to permit common mode thermal drift and bias voltage rejection in a differential read amplifier.

Figure 1:
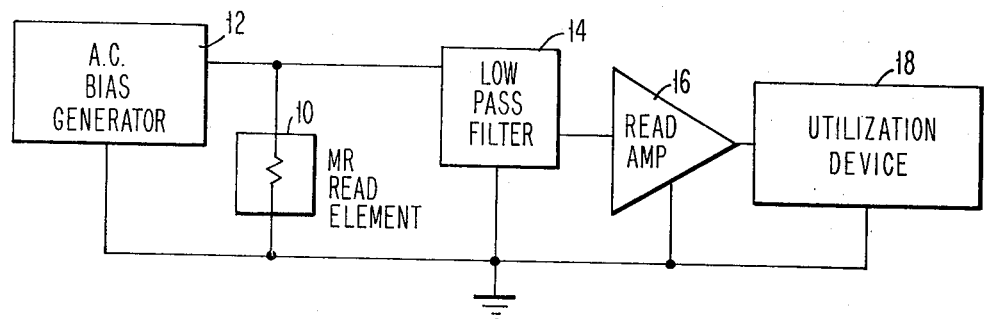
FIG. 1 is a block diagram of a prior art thin film magnetoresistive element interconnection for sensing magnetic flux transitions.

A prior art interconnection using a MR read element 10 biased by an alternating bias generator 12 is shown in FIG. 1. The advantages of using an alternating current for the bias is shown further in the curves according to FIG. 2 and will be discussed next with that figure. The alternating current bias is of a high frequency compared to the signals sensed by the MR read element. Therefore, a low pass filter circuit 14 is required in order to prevent the high frequency bias signals from reaching the read amplifier 16 while permitting the lower frequency data signals to be amplified and directed to the utilization device 18.

Figure 2:
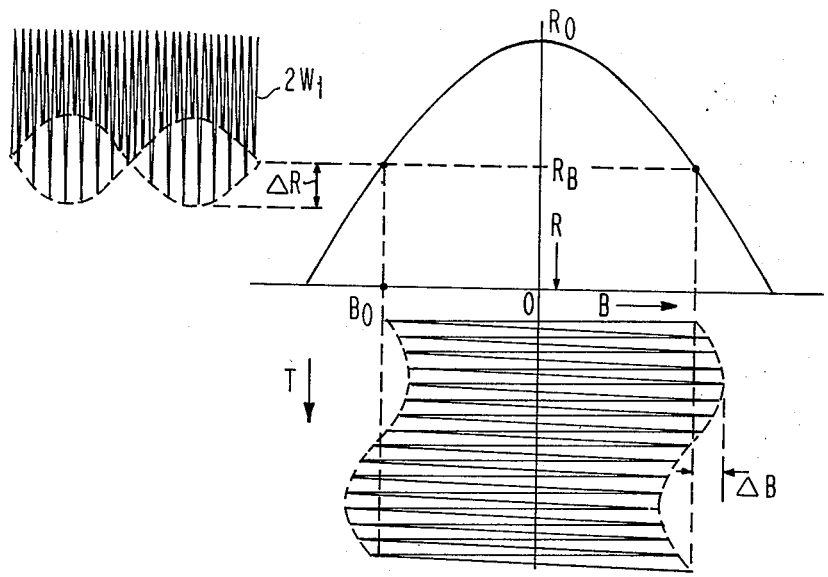
FIG. 2 shows the operation of a high frequency alternating current bias on a magnetoresistive element.

The theory of the high frequency biasing for the MR head element can readily be understood with the illustration shown in FIG. 2 together with FIG. 1. A constant biasing current of high frequency from the AC bias generator 12 will produce the AC field to influence the MR element 10. The changing resistance of the MR element 10 then comprises a DC component, an AC component of double the bias frequency, and some other frequencies of higher harmonics but much smaller amplitudes. When a signal $\Delta B$ of low frequency is sensed by the MR element as a result of the flux transitions, it will appear as two modulated terms of frequencies as indicated by the envelopes in FIG. 2. The change of resistance with flux density of a transverse magnetic field follows approximately a parabolic function. At a biasing field of substantial flux density $B_0$, the increase of resistance $\Delta R$ of the MR element may be considered as proportional to the incremental flux density $\Delta B$. The resistance $R_b$ is the resistance of the MR element at the biasing field $B_0$. thus with an alternating current bias field, a change in resistance $\Delta R$ of the MR sensing element produces the envelope or modulation of the AC bias.

The use of alternating current bias has the advantage that second harmonic distortion in the data signal resulting from the non-linear $\Delta R$ versus flux density characteristic is significantly reduced. It should be understood in the present invention that although the alternating current bias described herein refers to a sine wave shaped current, other sources could be used such as an alternating polarity pulsed bias source.

As is shown in the prior art of FIG. 1, the high frequency AC bias produced by the AC bias generator 12 is applied to the MR read element 10. Both the biasing frequency and the data signal sensed by the MR read element 10 is directed to a low pass filter 14 where the low frequency data information signals are passed to a read amplifier 16 and the high frequency bias signals are removed. The data signals can be sensed from magnetic flux transitions on media such as tapes or disks (not shown). The data signals are amplified in the read amplifier 16 and directed for usage in the utilization device 18.

A filter network such as low pass filter 14 has the disadvantage that all signals are degraded. The lower frequency data signals are not degraded as much as the bias signal, but nevertheless the amplitude of the data signals is affected. Preamplification is difficult because of the relative levels of the bias signal to the data signals. Thus the bias signal must be removed before any effective amplification can take place. The present invention uses a compensation MR element for several purposes one of which is to effectively use common mode rejection to remove the bias frequency.

It should be evident that a bias film or current conductors are needed to provide the magnetic field required to magnetically bias the MR elements into their operation range. A shunt bias head assembly 19 is disclosed in FIG. 3 flying over a media 20 for sensing magnetic flux transitions previously written into the media 20. The head assembly 19 of FIG. 3 includes a MR element 21 sandwiched between a conductor layer 22 and a shunt bias layer 23. The insulation 24 provides a magnetic insulation enclosing the MR element 21, the conductors 22 and shunt bias layer 23 from magnetic shields 25 and 26. The MR element may be formed of a Permalloy material that is vacuum deposited and has a thickness range of 200–500 Angstroms. The insulating layer may be made of silicon dioxide, for example. The shunt bias layer may be made of Titanium dioxide of approximately the same thickness as the MR element 21. The conductors 22 may be made of gold of sufficient dimensions to handle the required current. The magnetic shields 25 and 26 are generally made of ferrite and minimize the effect of stray magnetic flux which would decrease the resolution of the readback signal as the MR element 21 senses the transitions on the media 20.

The bias current is applied to the conductors 22. The bias current induces a magnetism in the MR element 21 and the shunt bias layer 23 that provides the magnetic field to bias the MR element 21 into its operating range. A soft film bias could be included with the present invention as disclosed in U.S. Pat. No. 3,864,751, issued on Feb. 4, 1975 to T. J. Beaulieu et al and assigned to the assignee of the present invention. In this patent a separate film of a magnetic material such as a soft Permalloy material could be provided adjacent to the shunt layer 22 of FIG. 3. Further, a separate layer of MR material could be deposited adjacent to the MR elements to provide a bias film as disclosed in the aforementioned U.S. Pat. No. 3,860,965.

Figure 4:
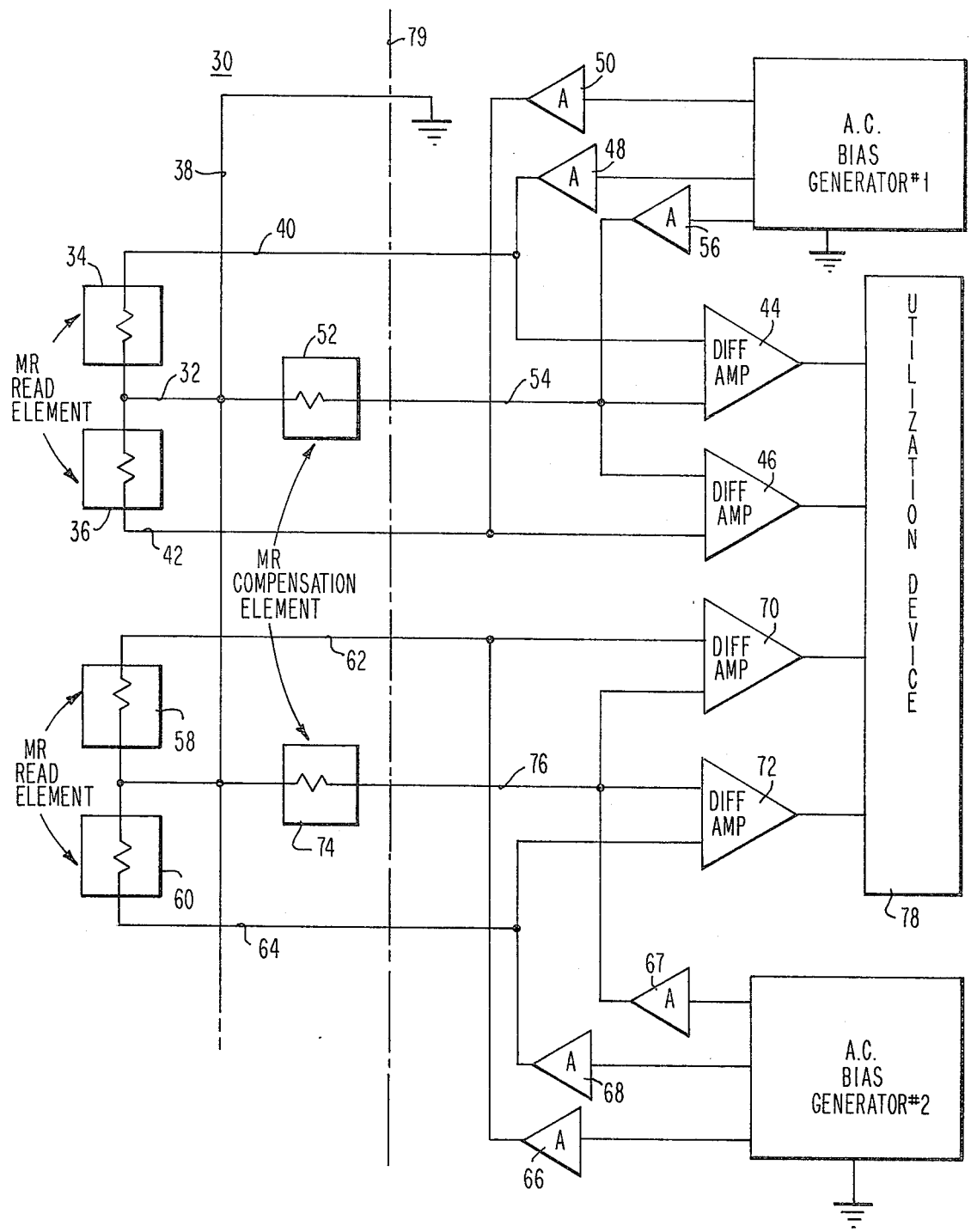
FIG. 4 is a block diagram of one embodiment using an MR balance element for multiple magnetoresistive read elements according to the present invention.

One embodiment of the inclusion of a single balance or compensation element for a plurality of read or sensing elements in a head assembly both for thermal shift compensation and bias current balancing according to the present invention is shown in FIG. 4. Referring to FIG. 4, a plurality of MR read elements are shown with a pair of MR read elements interconnected with one MR compensation element. One AC bias generator directs the alternating current bias to a ½ of the pair of MR read elements via buffer amplifiers. The output of each MR read element is directed to a differential amplifier. The output of the MR compensation element is directed to a pair of differential amplifiers which have their other input controlled by the associated MR read elements. The output of the differential amplifiers are in turn directed to a utilization device where the pulses sensed by the MR element are transmitted into the required data information.

A second AC bias generator directs an alternating current bias voltage to the remaining ½ of the pairs of MR read elements. As before, buffer amplifiers are interconnected between the AC bias generator and the MR elements. The buffer amplifiers have a high impedance output to prevent interaction of the various lead through the common AC bias generator interconnection. The second pair of MR read elements have one output connected to a differential amplifier with an associated MR compensation element connected to the second leg of both differential amplifiers. Similarly the outputs of the differential amplifiers are directed to the utilization device.

In particular to FIG. 4, a head assembly 30 includes one pair of MR read elements 34 and 36 having their center lead 32 connected to a common ground lead 38. Second leads 40 and 42 from the MR read elements 34 and 36 are connected to one input of differential amplifiers 44 and 46, respectively, and to an AC bias generator No. 1 through high impedance buffer amplifiers 48 and 50, respectively. A MR compensation element 52 is connected to the ground lead 38 and has its second lead 54 connected to the AC bias generator No. 1 through buffer amplifier 56. Second lead 54 is also connected to the second input of differential amplifiers 44 and 46.

A second pair of MR read elements 58 and 60 is similarly connected to the ground lead 38 and via conductor leads 62 and 64 connected to AC bias generator No. 2 via buffer amplifiers 66 and 68, respectively. The read elements 58 and 60 are also connected to one input to differential amplifiers 70 and 72, respectively. Likewise a MR compensation element 74 is connected to the ground lead 38 and via lead 76 to the AC bias generator No. 2 through a buffer amplifier 67 and to the second inputs to the differential amplifiers 70 and 72. The output of the differential amplifiers 44, 46, 70 and 72 are directed to a utilization device 78.

The leads 40, 42, 62 and 64 are the means for applying the bias current to the MR read elements 34, 36, 58 and 60, respectively, and also are the means by which the change in resistance of the elements caused by sensing a flux transition are transmitted to the differential amplifiers. Likewise leads 54 and 76 are the means by which the compensation elements 52 and 74 are biased and also by which the compensation signals are directed to their respective differential amplifiers.

It should be understood that although only two pairs of MR read elements are shown in FIG. 4, many pairs could be interconnected without departing from the present invention. Buffer amplifier outputs from both AC bias generators can be provided along with more differential amplifiers to accomodate the additional elements. The high impedance output buffer amplifiers shown, together with the differential amplifiers and bias generators suitable for use with the present invention are well within the capabilities of a person skilled in the art and need not be more fully explained herein.

The alternating current generated by bias generator No. 1 is 180° out of phase with the alternating current generated by bias generator No. 2. Since the alternating current applied to one pair of MR elements is 180° out-of-phase with that directed to the second pair of MR elements, the current through the common ground lead is essentially zero. This is assuming that the current generated by each bias generator is equal. The bias current required for each MR read element is approximately 20 milliamps. With only the 6 MR elements shown in FIG. 4 the ground leads can be made sufficiently large to handle the current flow, but it is not unusual to have 10 to 20 pairs of elements in one assembly. Without the present invention, a rather heavy conductor lead or many individual conductor leads would be needed for the return ground path in order to carry the required bias current.

With the present invention, however, the return ground lead 38 carries little or no current since the bias current required by one pair of MR read elements 34 and 36 and its MR compensation element 52 is cancelled by the second set of elements, MR read elements 58 and 60 and MR compensation element 74. It should be recognized that the assembly shown in FIG. 4 represents a plurality of pairs of MR read elements connected to the AC bias generator No. 1 and another plurality of pairs of MR read elements connected to the AC bias generator No. 2, generally equal in number to balance the current in the ground lead.

The thermal drift compensation and bias balancing is provided by the compensation element together with the differential amplifiers. Briefly, the common mode rejection capability of the differential amplifier is used to reject any signal appearing on both input leads to the differential amplifier. A differential amplifier operates to amplify only signals that are different in amplitude or phase on one input as opposed to that appearing on the other input. Only the difference in amplitude at any point in time is amplified. Thus since the compensation element is affected by the same influences as the read element, unwanted signals resulting from the influences, such as heat, are applied to both input of the differential amplifier and thus are cancelled and not amplified. Only the read elements are positioned over magnetic flux transitions and the signals resulting from the transitions are applied to one input and thus are amplified by the differential amplifier. All elements are affected generally by the same influences and thus, as taught by this invention, one compensation element can effectively supply a compensating output for a plurality of read elements.

For this same reason, the differential amplifiers cancel the bias signals. In-phase alternating current bias signals are applied to both inputs of each differential amplifier and thus are not amplified. The amplification of only the low amplitude read signals occurs without the possibility of overdriving by the bias signal. Further there is no degrading of the signal as occurs when a filter network, such as the low pass filter 14 of FIG. 1, is used.

Also, lesser number of connecting leads are required in the present invention. In FIG. 4, the head assembly 30 is shown separated from the associated circuitry by a dotted line 79. The dotted line 79 cuts across the head assembly connecting leads and thus determines the number of leads required. In this embodiment, three leads are required for each pair of read elements including the compensating element, plus the return lead. This is a savings of one lead per pair of elements since the prior art compensated MR assemblies such as that disclosed in U.S. Pat. No. 3,860,965 required two leads per read element and compensation element combination plus the ground lead.

Figure 5A:
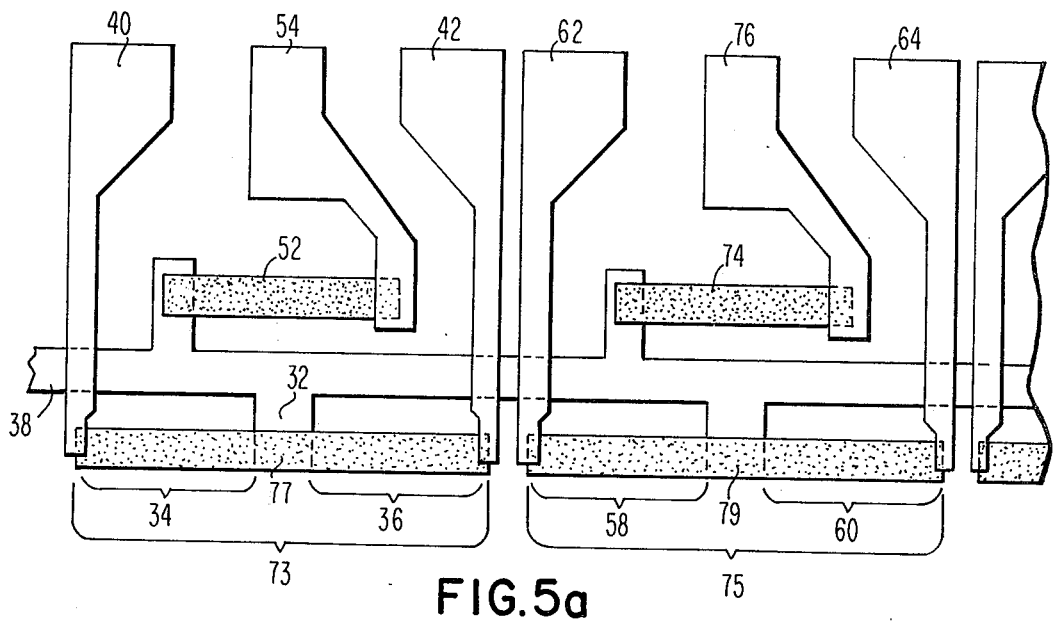
FIGS. 5a and 5b show two methods of thin film construction for the embodiment of the present invention as shown in FIG. 4.
Figure 5B:
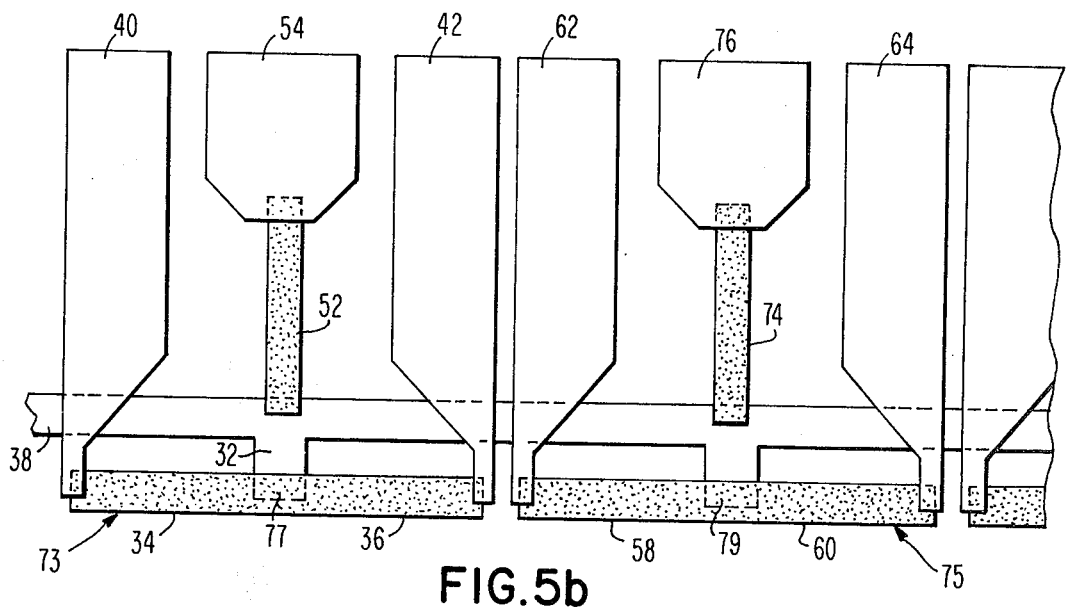

The MR compensation elements can be interconnected with the MR read elements in many different ways. In FIGS. 5a and 5b are shown two thin film layouts showing the position and interconnection of conductors and the MR material to accomplish the reading of magnetic flux transitions and the thermal compensation and bias balance. In FIG. 5a, the MR compensation elements 52 and 74 are shown deposited parallel to the MR sensing or read elements. Each pair of MR read elements are center connected with the ground or return lead 38. The ends of each pair of elements are connected through conductors to the biasing source and to the inputs to the differential amplifier as shown in FIG. 4. The paired MR sensing elements 34, 36 and 58, 60 can be easily formed by depositing longer strips of MR material 73 and 75 and having the ground lead 38 connect to the center of each strip at points 77 and 79 to form a pair of MR sensing elements. Thus the MR strip 73 forms the pair of MR sensing elements 34 and 36 by the ground lead 38 connection through conductor 32 at point 77. One stripe is centertapped to form two MR sensing or read elements.

Another method of forming the MR compensation elements is shown in FIG. 5b. The deposition of the separate layers to accomplish the conductors in the MR elements is less complex in FIG. 5b since the MR compensation elements 52 and 74 are deposited perpendicular to the MR sensing elements. The separate conductors and elements are interconnected as shown in FIG. 4 and have similar reference numerals.

Figure 6:
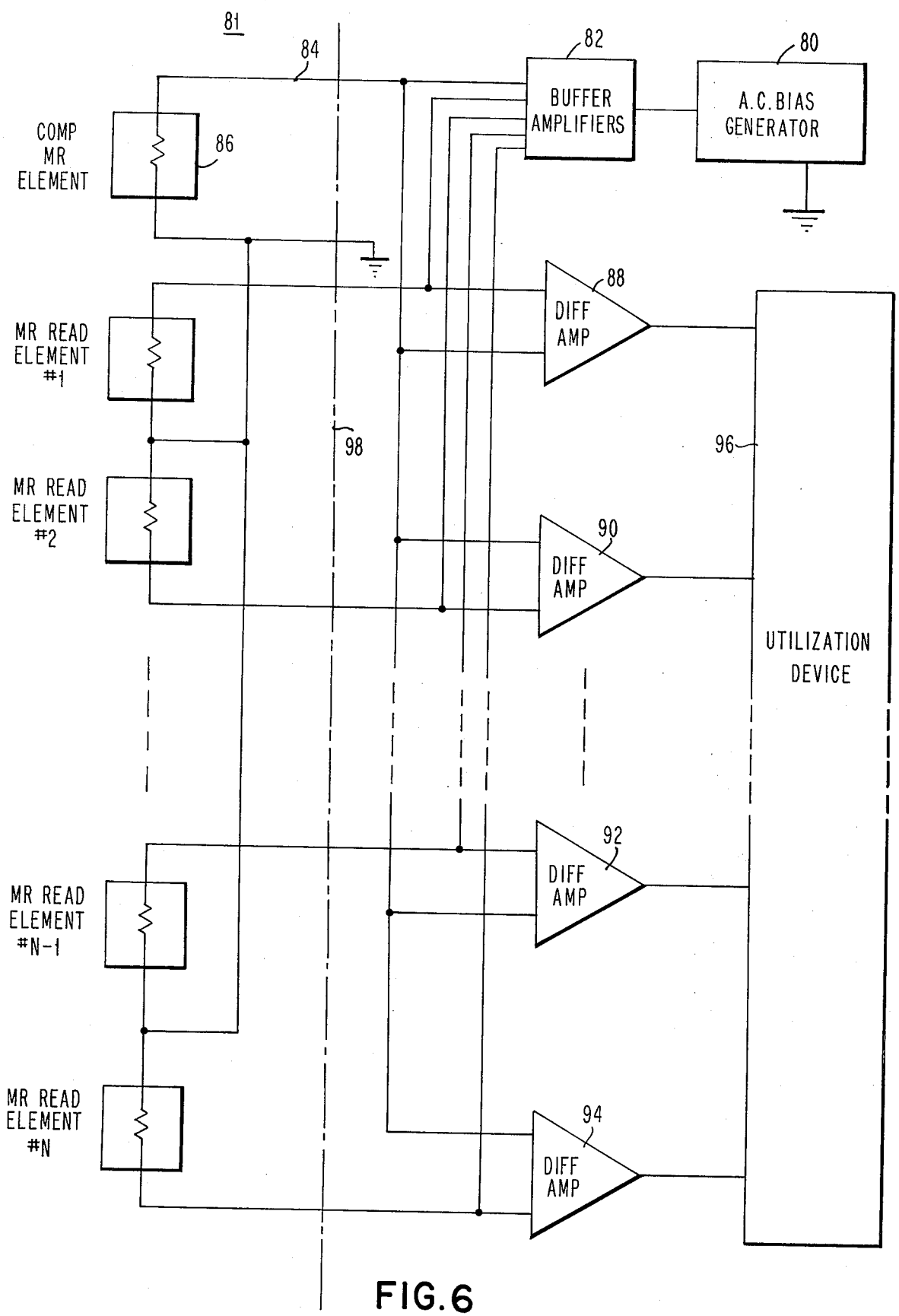
FIG. 6 is a block diagram of another embodiment of the present invention.

If the electrical current through the ground return lead is of little importance, one compensation element can be used for an entire head assembly. The interconnection of the elements for this embodiment of the present invention is shown in FIG. 6. In this embodiment, one AC bias generator 80 produces the alternating current bias for each MR element in a head assembly 81. Buffer amplifiers identified as block 82 distribute the bias current and provide the required isolation between MR elements. An input lead 84 from MR compensation element 86 is directed to one leg of each differential amplifier, four shown identified by reference numerals 88, 90, 92 and 94. The other leg of the differential amplifiers are connected to an individual MR sensing element and through individual buffer amplifiers 82 to the AC bias generator 80. The output of the differential amplifiers are connected to a utilization device 96 for utilization of the data information taken from the flux transitions sensed by the MR read elements. In this embodiment, one MR compensation element 86 provides common mode rejection of thermal shift and bias current signal while providing a decrease in the number of connections between the head assembly and the outside or external connections.

The number of interconnections between the head assembly 81 and the remaining circuitry blocks is shown by the leads intercepting the dashed lines 98. Thus in this embodiment, the number of lines required are equal to the number of read elements plus two. In the embodiment shown in FIG. 6 only one extra conductor to that required for the MR sensing elements if required. In prior art compensation elements where one compensation element is required for each sensing element, two conductors plus the common return or ground is needed for each sensing element. Thus according to the present invention, the MR element can be centertapped and thus the number of external connections required for a head assembly is the number of sensing elements plus the ground lead and the one lead to the compensation element. The embodiment shown in FIG. 6 offers a reduction in the number of external connections for a head assembly while providing a common mode rejection of thermal shift and bias signal balancing by the MR compensation element.

A second compensation element can be added to the configuration shown in FIG. 6 to arrive at a means for reducing the total current in the return or ground lead while providing the AC bias and the common mode rejection capabilities of the present invention. This embodiment is shown in FIG. 7.

Figure 8:
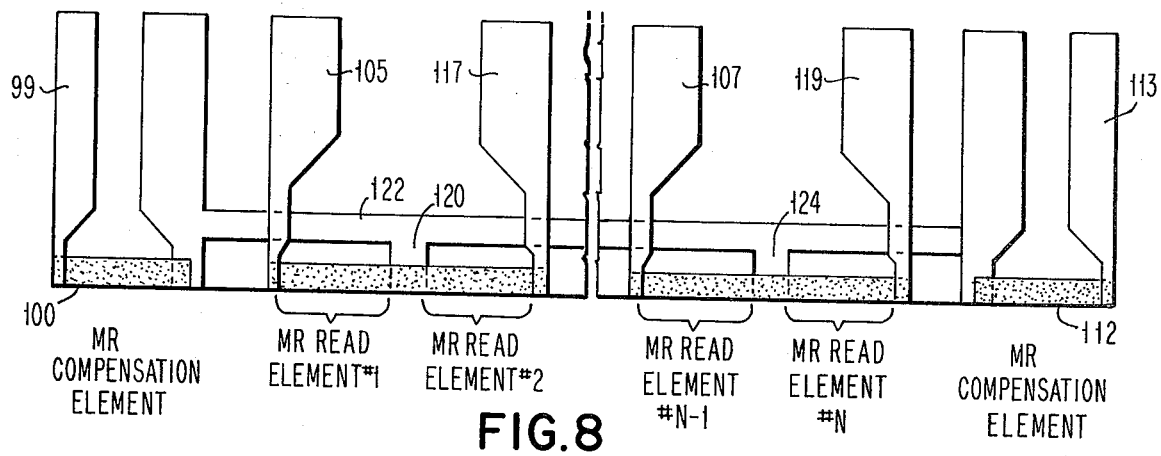
FIG. 8 shows a thin film construction of a multiple head assembly according to the embodiments shown in FIGS. 6 and 7.
Figure 7:
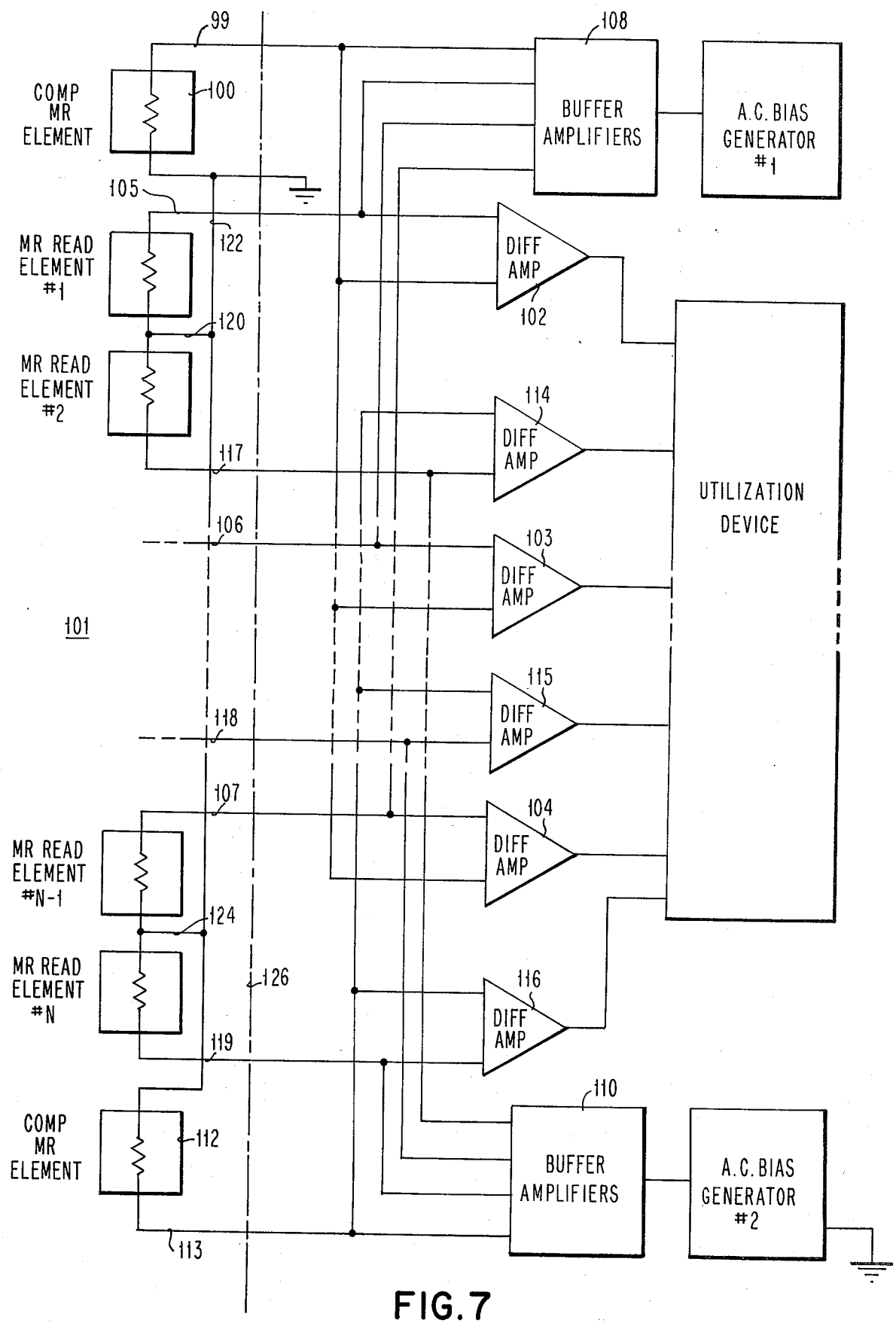
FIG. 7 shows a block diagram of a third embodiment of the present invention using two bias generators to balance the return line current.

In the block diagram of the assembly shown in FIG. 7, an AC bias generator No. 1 directs its bias current to one MR compensation element 100 via lead 99 and to one input of a first group of differential amplifiers represented by numerals 102, 103 and 104. The second input to these differential amplifiers are connected to MR read element No. 1, an unidentified read element, and MR read element No. 6 N-1 via conductors 105, 106 and 107 respectively. The individual MR read elements are identified by No.'s from 1 to N. Each pair of elements are therefore identified by the interconnection through a common central conductor 122. The pair of elements, see FIG. 8, is generally one MR element deposited with a centertapping conductor dividing the element into two read or sensing elements.

suitable buffer amplifiers represented by block 108 interconnect the AC bias generator No. 1 with one element of each pair of MR read elements to provide isolation of the signals from one MR element to the next. An AC bias generator No. 2 has its output, via buffer amplifiers 110, connected to a second MR compensation element 112. The second MR compensation element 112 is connected to one input to a second plurality of differential amplifiers 114, 115 and 116 whose other input is connected to the second of the pair of MR read elements, MR read element No. 2, an unidentified element, and MR read element EN, respectively, via leads 117, 118 and 119. The second elements of the pair of MR read elements are suitably connected to the AC bias generator No. 2 through high impedance buffer amplifiers 110 to provide isolation of the data signals as previously discussed.

The interconnection of the head assembly as shown in FIG. 7 provides for a cancellation of the bias signals in the ground or return lead between each MR element of the pair along with bias balancing and thermal shift compensation. Thus the No. 1 MR read element in the first pair is connected to the AC bias generator No. 1 and to the differential amplifier 102. MR read element No. 2 is paired with MR read element No. 1 and has an interconnection via a central conductor 120 to the ground lead 122. MR read element No. 2 is driven by the AC bias generator No. 2 and is connected to the differential amplifier 114. The second leg of the differential amplifier 102 is connected to the first MR compensation element 100 while the second input lead of the differential amplifier 114 is interconnected to the second MR compensation element 112. The bias current produced by AC bias generator No. 1 and AC bias generator No. 2 is 180° out-of-phase with each other. The interconnection according to that shown in FIG. 7, wherein each MR read element in its pair is driven by a bias current that is 180° out-of-phase, provides a current cancellation in the main central return lead 122 and also in the lead 120 that interconnects the center of the MR element with return lead 122. Thus these leads carry essentially no current, provided the AC bias generators and MR read elements are matched. The leads 120, 122 and 124 can be a relatively thin layer of copper or gold or any other similar conductive material. In the layout of the head assemblies shown in FIGS. 6 and 7, the compensation elements are placed on the outer edge of the head assembly in an outrigger fashion as shown in FIG. 8.

In the embodiment shown in FIG. 7, the savings in leads providing the means for applying the bias current to the MR elements and also provide the means for transmitting the change in resistance signals to the differential amplifiers is even greater than the embodiment shown in FIG. 4. The number of leads intersecting a dashed line 126 that separates the head assembly 101 from the circuitry on the figure is the number of read elements N plus three. The three extra are the return lead 122 and leads 99 and 113 to the compensation MR elements 100 and 112 respectively.

Referring to FIG. 8, the pair of MR read elements identified by MR element No. 1 and MR element No. 2 are shown connected to conductors 105 and 117. Similarly the pair of MR read elements identified as MR element No. N-1 and MR element No. N representing a plurality of MR read elements are connected to conductors 107 and 119. The references used in FIG. 8 are similar to that shown in FIG. 7 in order to identify these interconnections internal to the head assembly.

The outrigger MR compensation elements 100 and 112 are interconnected to the common ground leads 122 and to separate conductor leads 99 and 113. The embodiments according to this design is usable in either the connection as shown in the embodiment of FIG. 7 or, if the connection as shown in the embodiment of FIG. 6 is used, only one outrigger compensation element would be required.

Figure 3:
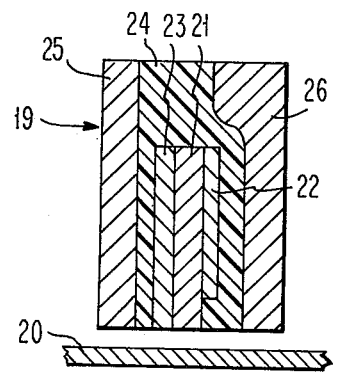
FIG. 3 is a sectional view of the MR transducer assembly showing representative layers including a shunt bias layer.

The embodiment of the layout of the thin film element as shown in FIG. 8 has the further advantage in that the MR compensation elements 100 and 112 are close to the media being read (not shown) by the MR read elements. Thus any heating of the read elements should be reflected in the compensation elements. The differential amplifiers will provide the cancellation of the thermal shift through common mode rejection. Further any lapping performed on the head to arrive at the required height of the MR read element also affects the size of the MR compensation elements. The outrigger compensation element design according to FIG. 8 is the preferred embodiment according to the present invention. The MR elements in the present invention can be made of a Permalloy material having an 80% nickel-20% iron composition and are approximately 0.03 microns thick. It is evident that isolating layers are provided between the conductor layers to prevent shorting. The insulating layer can be silicon monoxide or other materials well known in the thin film art. Further, it should be evident that a suitable bias film as shown in FIG. 3 is necessary in the thin film layouts of FIGS. 5a, 5b and 8. The bias film or conductor could be placed on top of the MR elements. The bias film provides the magnetic field for the operational magnetic bias of each MR element.

There has been described herein a magnetoresistive head comprising a magnetoresistive compensation or balancing element common to a plurality of the read elements. Further, interconnections are shown to decrease the number of conductors necessary for external connection from the head assembly to the sources such as the bias generator and the outputs such as the differential amplifiers. The present invention provides a means of rejecting noise produced by thermal fluctuations as well as other changes in drive currents and mechanical stresses and the like while providing for an easier method of manufacturing through the lower number of conductors provided. The head according to the present invention lends itself well towards high density magnetic recording and a large number of elements in each head without requiring heavy conductor leads.

The principles of the present invention have now been made clear in an illustrative embodiment. There will be immediately obvious to those skilled in the art many modification of structures, arrangement, proportion, the elements, materials and components used in the practice of the invention. For instance, it should be apparent that substitute materials could be used as the compensation elements in the invention. As taught in the IBM Technical Disclosure Bulletin Vol. 17, No. 9, February 1975 at p. 2759 resistance material can be used to compensate for the MR sensing element by common mode rejection. Thus resistance and temperature sensitive materials could be substituted for the MR material as the compensation element. The appended claims are, therefore, intended to cover and embrace any such modifications within the limits only of the true spirit and scope of the invention.

I claim:

1. A head assembly for sensing magnetically recorded information from a medium comprising:
   a plurality of magnetoresistive elements sensing the magnetically recorded information and providing information signals from each indicative of a resistance of each element
   a compensating element, providing a reference signal indicative of its resistance
   a return bias and signal path conductor means providing one input to each element; and
   conductor means for supplying a bias current to each element and for providing said information signals and said reference signal, whereby difference signals can be derived by differentially sensing said information signals with said reference signal.

2. A head assembly as defined in claim 1 wherein said compensating element is made of a magnetoresistive material.

3. A head assembly as defined in claim 1 wherein paired magnetoresistive elements are formed by centertapping a double length magnetoresistive strip.

4. A head assembly as defined in claim 3 including a plurality of paired magnetoresistive elements and one compensation element for each paired magnetoresistive element.

5. A head assembly as defined in claim 4 wherein approximately one-half of the elements are connected to conductor means supplying an alternating bias current of a first phase and polarity and the remaining elements are connected to conductor means supplying an equal alternating bias current of a second phase and opposite polarity, taken at any one time, relative to the first phase.

6. A head assembly as defined in claim 1 wherein said compensation element is deposited parallel to said magnetoresistive elements.

7. A head assembly as defined in claim 1 wherein said compensation element is deposited perpendicular to said magnetoresistive elements.

8. A head assembly as defined in claim 1 wherein said compensation element is deposited on a plane with the magnetoresistive elements in an outrigger fashion at approximately the same distance from the media as the magnetoresistive element.

9. A head assembly as defined in claim 1 further including a second compensation element wherein the signal from a compensation element provides a difference signal for the signals from approximately one-half of said plurality of magnetoresistive elements.

10. A head assembly as defined in claim 9 wherein said conducting means supplies an alternating bias current of a first phase and polarity to one compensating element and its associated approximately one-half of said plurality of magnetoresistive elements and supplies an alternating current of a second phase and opposite polarity to the second compensation element and its associated plurality of magnetoresistive elements.

11. A head assembly as defined in claim 1 including a plurality of paired magnetoresistive elements and a second compensation element, wherein one magnetoresistive element of each pair is connected to conductor means with one compensation element and wherein said conducting means supplies an alternating bias current of a first phase and polarity to one compensating element and its associated magnetoresistive elements and supplies an alternating current of a second phase and opposite polarity to the second compensation element and its associated magnetoresistive elements.

12. A head assembly as defined in claim 1 wherein said compensating element is formed from a magnetoresistive material.

* * * * *